United States Patent Office 3,165,4
Patented Jan. 12, 19

3,165,486
CROSS-LINKED OLEFIN-MALEIC ANHYDRIDE
INTERPOLYMERS AND SALTS THEREOF
John H. Johnson, Dayton, Ohio, assignor to Monsanto
Company, a corporation of Delaware
No Drawing. Filed Sept. 29, 1958, Ser. No. 763,796
26 Claims. (Cl. 260—29.7)

This invention relates to cross-linked $C_2$-$C_4$ olefin and maleic anhydride interpolymers and salts thereof, and particularly to interpolymers of ethylene, propylene, n-butylene, and/or isobutylene with maleic anhydride using as vinyl ester of an olefinically unsaturated carboxylic acid as the cross-linking agent, and to aqueous dispersions of alkali, amine or ammonium salts thereof. This application is a continuation-in-part of my copending applications Serial Nos. 712,680 and 712,681; both now abandoned, filed February 3, 1958.

Many cross-linking agents are known for use in the production of cross-linked styrene-maleic anhydride polymers and others. U.S. 2,647,886 teaches a large number of cross-linking agents suitable for use with styrene and maleic anhydride comonomers. It appears from the teachings of this patent that any one of the cross-linking agents named therein as well as many not named would be suitable for cross-linking styrene and maleic anhydride in polymers.

Surprisingly, I have found that a number of bifunctional compounds which might be expected to be good cross-linking agents for $C_2$-$C_4$ olefins and maleic anhydride comonomers are not at all suitable especially for my particular purpose namely for preparing interpolymers useful as thickeners for textile printing pastes. For example, the following bifunctional compounds were tested using 1% by weight cross-linking agent based on reacting monomers and standardized polymerization conditions with ethylene and maleic anhydride comonomers: divinyl benzene, N,N-dialkyl toluenesulfonamide, vinyl allyl ether, triallyl isocyanurate, diallyl cyanamide, triallyl cyanurate, and ethylene glycol dimethacrylate. None of these compounds proved to be effective or usable. It is most surprising that divinyl benzene which proved to be an excellent cross-linking agent for styrene and maleic anhydride comonomers as indicated in U.S. 2,647,886, gave no appreciable cross-linking with ethylene and maleic anhydride resulting in a dimethylformamide soluble polymer even when the amount of divinyl benzene was increased above 2% based on reacting monomers. Ethylene glycol dimethacrylate taught in this patent as a cross-linking agent does not cross-link my product either.

Also, the following bifunctional compounds tested with propylene and maleic anhydride were found to be ineffective: divinyl carbitol, divinyl sulfone, vinyl allyl ether, N,N-methylenebisacrylamide, and divinyl benzene. Again, divinyl benzene which proved to be an excellent cross-linking agent for styrene and maleic anhydride, gave no appreciable cross-linking with propylene and maleic anhydride. In other words, divinylberzene and these other cross-linking agents which are indicated to be ineffective just do not cross-link either ethylene or propylene and maleic anhydride copolymers to any measurable extent. The results, of course, would be expected to be the same wherein the olefin comonomer was isobutylene or n-butylene.

It is a primary object of this invention to provide cross linked $C_2$-$C_4$ olefin and maleic anhydride interpolymer usable in salt form as thickeners in textile printing pa These and other objects of the invention will become apparent as a detailed description of the invention proceeds.

Broadly, the invention comprises reacting $C_2$-$C_4$ olefin with 1,2-dichrboxylic acids and their derivatives in presence of the vinyl ester cross-linking agents. dicarboxylic acids can be maleic acid, fumaric acid, mono or dichloro substituted maleic and fumaric ac alkylated maleic and fumaric acids, mono and diph maleic acids, benzyl maleic acid, dibenzyl maleic a ethyl maleic acid or any similar acids containing a doi bond in the chain between the carboxyl groups such mesaconic and citraconic acids. Acids where the dol bond has shifted from the 1,2 position, such as itac and glutaconic acid can also be used. However, the hydride of each of the above acids capable of anhyd formation will normally be preferred rather than acids.

More narrowly, the interpolymers of the invention formed by polymerizing a monomeric mixture of ma anhydride and a $C_2$-$C_4$ olefin or olefin mixture usin cross-linking agent which is a vinyl ester of an olefinic unsaturated carboxylic acid having from 3 to 24 car atoms in an amount in the range of about 0.1 mol perc and about 5 mol percent, preferably from about 0.3 percent to about 3 mol percent, based on reacting mc mers. Normally with ethylene, it will be preferred the interpolymer be produced using about 4:1 or hi molar ratio of ethylene to maleic anhydride even tho they react to form the interpolymer in substantially a molar ratio; however, the interpolymer can be m using a larger or smaller molar ratio. If the olefi charged in a molar excess as compared to the maleic hydride the amount of the reacting monomers are ea calculated from the amount of maleic anyhdride char to the reaction vessel and the assumption that an ec molar amount of olefin reacts therewith. This assu tion has proven to be true to a sufficiently close de that no practical error results from its assumption.

As has been indicated the interpolymers of the in tion are formed from maleic anhydride and a $C_2$-$C_4$ fin, i.e. ethylene, propylene, n-butylene, and isobutyl using as a cross-linking agent a vinyl ester of an olei cally unsaturated carboxylic acid having from 3 to carbon atoms. An illustrative but non-limiting list cross-linking agents is as follows: The vinyl esters acrylic acid, methacrylic acid, crotonic acid, isocrotc acid, vinylacetic acid, 2-pentenoic acid, 3-methyl-2-hexe ic acid, 2-hexenoic acid, 2-heptenoic acid, 4-ethyl-2 tenoic acid, 2-nonenoic acid, 9-decylenic acid, stillir acid, 9-dodecylenic acid, palmitoleic acid, oleic acid, ri oleic acid, petroselenic acid, vaccenic acid, linoleic a linolenic acid, eleostearic acid, licanic acid, parinaric a gadoleic acid, arachidonic acid, cetoleic acid, erucic a nervonic acid, etc. Other suitable vinyl esters are the vi or divinyl esters of unsaturated dicarboxylic acids such the following: vinyl maleate, divinyl maleate, vinyl fu ite, divinyl fumarate, vinyl itaconate, divinyl itaconate, [vi]nyl citraconate, divinyl critraconate, vinyl mesaconate, vinyl mesaconate, vinyl glutaconate, divinyl glutaconate, [et]c.

For use as thickeners in textile printing pastes the [inte]rpolymers should be made using at least an amount of [th]e cross-linking agent sufficient to make interpolymers [w]hich are substantially insoluble, i.e. at 2% polymer con[ce]ntration do not form a clear solution but rather a [th]ixotropic gel, in dimethylformamide at 25° C., and they [ar]e used as thickeners in the form of an alkali metal (i.e. [so]dium, potassium, lithium, rubidium or cesium), amine [an]d/or ammonium salts forming a dilute swollen gel or [di]spersion in aqueous medium. When polymeric anhy[dr]ides are dissolved using ammonia or amine bases, an [ap]preciable amount of amide groups are formed resulting [in] mixed ammonium-amide or amine-amide polymeric [sa]lts, but if the anhydrides are first hydrolyzed to the acid [be]fore neutralization the salts will be preponderantly am[m]onium or amine salts. The term amine salt will be [us]ed generically throughout this specification and the [cl]aims thereof to cover the ammonium salts, the amine [sa]lts, the ammonium-amide salts, and the amine-amide [sa]lts; however, in some cases the term ammonium salt [w]ill be used generically to cover only ammonium and [am]monium-amide salts. Mixtures of alkali metal and [a]mine salts can, of course, also be used, if desired and [th]ese mixed salts would be substantially equivalent to [ei]ther alone. The amines which are preferred are the [lo]wer alkyl primary and secondary amines such as methyl [am]ine, dimethyl amine, ethyl amine, diethyl amine, the [pr]opyl amines, the dipropyl amines, n-hexyl amine etc. [H]owever, longer chain amines such as stearyl or palmityl [pr]imary or secondary amines, etc., or even polyamines [su]ch as ethylenediamine or diethylenetriamine, etc., can [be] desirable for special uses. For comparison of proper[ti]es an arbitrarily selected 1½% by weight aqueous dis[pe]rsion of the interpolymer salt having a pH in the range [o]f about 7 to about 11 for alkali metal salts, preferably [fr]om 8 to about 10, is chosen, since these pH values repre[se]nt the upper range of the viscosities associated with the [ap]proach to full neutralization of all carboxyls, but aque[ou]s viscosities are still quite high and useful even with [th]e pH as low as 5. In the case of amine salt viscositie[s a]re high in the range of about 4 to about 10 pH, but the [p]referred range is about 5 to about 7 pH. These 1½% [w]eight dispersions in water of the salts for greatest ef[fi]ciency as printing paste thickeners have a viscosity greate[r th]an 10,000 centipoises at 25° C., preferably greater than [5]0,000, and the viscosity can be greater than 100,000 [ce]ntipoises at 25° C. Less of a higher molecular weight [o]r higher cross-linked interpolymer salt is required fo[r th]e printing paste, than if a lower molecular weight o[r l]ower cross-linked material is used. The salt can be used [as] aqueous dispersion in water in an amount of about [be]tween about 0.1% and about 15% by weight, prefer[ab]ly 0.25 to about 10%, in formulating the textile print[in]g pastes. The pH range should be chosen to yield [m]aximum useful viscosities in accordance with the partic[ul]ar base used and with consideration of the pH require[m]ents and limitations of the particular system to be [th]ickened.

Some types of coloring materials such as pigments or [dy]es used for printing cotton, rayon, nylon and other fab[ri]cs are already handled as high concentrations of the pig[m]ent (dye) dispersed in an inorganic solution of synthetic [re]sin. They are applied by conventional means such as [by] rollers to the fabric in the form of a pigment-in-water [em]ulsion. The emulsion is prepared by dispersing a [pe]troleum solvent in an unpigmented resin solution called [a] "clear," e.g., see Example 4 of U.S. 2,364,692. My [no]vel thickener in the salt form could, for example, be [su]bstituted for the ethyl cellulose of Example 4 of the [pa]tent with proper adjustment as to amount to compensate [fo]r differences in efficiency of thickening of these two different types of thickeners. The emulsion can be formed by mixing an aqueous dispersion of my salt with a petroleum solvent. However, it should be understood that my salts can be used as a print paste vehicle resin in a completely aqueous system without the petroleum solvent, particularly the higher cross-linked and/or higher molecular weight material. After application of the dye to the fabric the fabric is dried and sometimes aged for color fastness. Aging and drying can be accomplished by steaming the fabric.

The novel cross-linked interpolymers or salts thereof are also useful as thickeners in fluids used in depleted oil wells to increase oil recovery by displacing oil from the oil sands. This process is referred to in the trade as "water-base fracturing." Normally these "water-base fracturing" fluids are used to carry sand into the formation to aid in the oil displacement. For this use the thickeners are especially effective in the form of hydrolyzed interpolymers or in the ammoniated form which would provide amide-ammonium salts of the interpolymers. To these "water-base fracturing" fluids containing the novel thickeners of the invention can be added fluid-loss or other additives, if desired. Acids such as HCl are normally used to break gels in the two-step process wherein the acid is added after the gel is pumped into the formation. Rather than adding the agent to break the gel after pumping the gel into the formation, the gel-breaking agent can be incorporated in the fluid before it is pumped into the formation. In this latter case, however, the gel breaker must be slow acting and not break the gel until the fluid has been pumped into the formation. For example, sodium acid tetrametaphosphate can be suitable gel-breaker for addition to fracturing fluids using my novel thickeners since it will degrade slowly by scission to produce a very acid solution. Also the salts of the half-amide half-acid form of the cross-linked interpolymers can be used as the thickener for oil drilling muds.

The novel interpolymers, the hydrolyzed products, and salts thereof, can be additionally used in the formation of various mucilaginous or colloidal gel applications such as dentifrices, talc suspensions used in making dental impressions, bread dough, surgical jellies, creams and ointments, bulk laxatives, generally as thickeners for aqueous systems (e.g. latex paints), carrying agents, ion-exchange resins and other materials for use in treatment of various disorders of the human and animal gastro-intestinal tract, etc. Also, they can be used as suspending agents for flocculation treatment of ores for concentration or beneficiation or mineral dressing, especially iron, uranium, rare earth metals and molybdenum ores, etc. A further use is in industrial or sewage waste waters for coagulation to clean up the water before dumping in a stream, e.g. paper mill waste water. Yet another use is to help suspend fines and improve uniformity of fibers in paper manufacture. For some of these uses the pH of the salt would be varied from substantially below 3 to substantially above 11 depending on the particular properties that may be desired.

In making the new interpolymer, conditions conventionally used in the preparation of olefin-maleic anhydride copolymers are suitable and peroxide catalysts are used in the polymerization. Preferred conditions fall within the range of about 0° to 100° C. preferably about 30° to about 100° C., and about 0 to about 600 p.s.i.g. depending on the particular olefin used. Radiation polymerization can also be used to produce the novel interpolymers e.g. using such high-energy radiation sources as X-rays, γ-rays, neutrons, and the like. The reaction is preferably carried out in the presence of inert solvents such as ethylene dichloride. An aromatic hydrocarbon solvent like benzene is also a very satisfactory solvent for this reaction. A less preferred method of forming the new cross-linked olefin-maleic anhydride interpolymers is to add the cross-linking agent to the copolymer and carry out the cross-linking as a separate chemical reaction or polymerization step. It is rather preferred to add the cross-linking agents to the maleic anhydride and olefin comonomer during the initial polymerization step since more stable and more improved interpolymers result.

The invention will be more clearly understood from the following detailed description of specific examples thereof:

EXAMPLE 1

A three liter rocking autoclave was charged with 267 grams of maleic anhydride, 2089 cc. of ethylene dichloride, and 3.71 grams of benzoyl peroxide polymerization catalyst. The autoclave (bomb) was pressurized to 100 pounds per square inch gauge (p.s.i.g.) with ethylene, rocked at room temperature for about 10 minutes and the ethylene vented. This flushing operation was repeated once more to free the reaction mixture of dissolved air. The bomb was then charged with sufficient ethylene to give an estimated 300 p.s.i.g. on heating to the reaction temperature of 70° C. Rocking of the bomb was started and the temperature brought up to 70° C. by means of an electrically heated jacket. Additional ethylene was charged into the bomb from time to time to maintain the bomb pressure at approximately 300 p.s.i.g. After about 16 hours at 70° C. during which time the absorption of ethylene had ceased, unreacted ethylene was vented. The total reaction mixture was filtered, and the separated ethylene-maleic copolymer washed with ethylene dichloride while filtering. The polymer was dried at 108° C. for about 12 hours under the full vacuum of a water aspirator, and the yield of 1:1 copolymer of ethylene and maleic anhydride was 342 grams.

The specific viscosity of this copolymer was determined at 25° C. by modification of ASTM method D-445-446T, method B, using an Ostwald viscosimeter. The copolymer was dissolved in 1 weight percent concentration in dimethylformamide and the specific viscosity determined. The specific viscosity was 0.532 at 25° C.

EXAMPLE 2

The experiment of Example 2 was run in a substantially identical manner to that of Example 1, except for changes in conditions and reactor charges indicated as follows:

| | |
|---|---|
| Maleic anhydride _____grams__ | 267 |
| Ethylene _____p.s.i.g__ | 450 |
| Ethylene dichloride _____cc__ | 2089 |
| Benzoyl peroxide _____grams__ | 3.48 |
| Vinyl crotonate _____do____ | 1.71 |
| Temperature _____° C__ | 60 |

The amount of vinyl crotonate represents 0.5% by weight or 0.28 mol percent based on reacting monomers, the reaction time was about 17½ hours, and the yield of product polymer was 336 grams.

A specific viscosity determination was attempted on the polymer produced in Example 2, but it was found that 1% of this polymer formed an insoluble gel in dimethylformamide, so no specific viscosity determination was possible.

A sample of the polymer of Example 2 was added to sufficient water containing sodium hydroxide to make up a 1½% concentration of the polymer in water, the sodium hydroxide having been added in sufficient amount to neutralize the maleic anhydride copolymer forming substantially the disodium salt of the polymer and giving a pH of 9.28. The resulting dispersion of the polymer salt in water was tested for viscosity with a Brookfield viscosimeter using a number 4 spindle at 6 r.p.m. The viscostly of the dispersion was 14,600 centipoises at room temperature (about 25° C.).

EXAMPLE 3

The polymerization run of Example 3 was conducted in the same manner as was that in Example 2 except for changes in conditions and reactor charge indica follows:

Maleic anhydride _____grams__
Ethylene _____p.s.i.g__
Ethylene dichloride _____cc__
Benzoyl peroxide _____grams__
Vinyl crotonate _____do___
Temperature _____° C__

The amount of vinyl crotonate represents 1.0% by 0.56 mol percent based on reacting monomers, the r time was about 16½ hours, and the polymer yie 341 grams.

As in Example 2 an attempted specific viscos termination using 1% of the product polymer in dir formamide resulted in an insoluble gel, so no : viscosity determination could be made.

In a similar manner to that described in Exan a 1½% dispersion of the sodium salt of the poly water was prepared having a pH of 10.0. A Bro viscosity determination of this aqueous dispersio: a viscosity of 31,000 centipoises at room temp (about 25° C.). This higher viscosity polymer, of resulted from an increased amount of cross-linkin; as compared to the polymer of Example 2.

EXAMPLE 4

This experiment was the same as Example 3, that the polymerization conditions were varied usi C. and 450 p.s.i.g. as indicated from the followin;

Maleic anhydride _____grams__
Ethylene _____p.s.i.g__
Ethylene dichloride _____cc__
Benzoyl peroxide _____grams__
Vinyl crotonate _____do___
Temperature _____° C__

The reaction time was about 17 hours, and the y polymer was 346 grams. The polymer of this e: formed an insoluble gel in an attempted specific vi determination of 1% of the polymer in dimethyl mide.

In a similar manner to that described in Examp 1½% aqueous dispersion of the sodium salt of the mer was formed which had a pH of 10.15. A Bro viscosity determination of this aqueous dispersio: a viscosity of 68,400 cetipoises at room temperature higher viscosity material resulted from the higher n lar weight of the base polymer produced at the low perature and higher pressure as compared to Exar

EXAMPLE 5

In this experiment twice the amount of vinyl cro namely, 6.86 grams were charged to the autoclave a 2% by weight concentration, 1.12 mol percent, c crotonate in the final polymer. This experimen carried out in a similar manner to that of Example reactor conditions and reactor charge as follows:

Maleic anhydride _____grams__
Ethylene _____p.s.i.g__
Ethylene dichloride _____cc__
Benzoyl peroxide _____grams__
Vinyl crotonate _____do___
Temperature _____° C__

The reaction time was about 15 hours, and the y polymer was 349 grams. The polymer of this e: formed an insoluble gel in an attempted specific vi determination of 1% of the polymer in dimethylfor In a similar manner to that described in Examp 1½% aqueous dispersion of the sodium salt of ti ymer was formed with a solution pH of 10.8 Brookfield viscosity determination of this aqueo: persion gave a viscosity greater than 100,000 cent at 25° C., the exact viscosity not being determinabl was outside of the range of the particular instrument used. Viscosity determinations were made at lower concentrations of 1% and 0.5% salt and these results were 5,000 centipoises at pH 9.40 and 21,200 at pH 9.25, respectively.

Table I, which follows, summarizes the experiments discussed in detail above and also a number of other experiments which were carried out.

TABLE I
ETHYLENE-MALEIC ANHYDRIDE

| Ex. No. | Cross Linking Agent | Wt. Percent+(Mol Percent) X-Link | Temp., °C. | Press., p.s.i.g. | Spec. Visc. | pH | Brookfield Visc., cp. |
|---|---|---|---|---|---|---|---|
| | | 0 | 70 | 300 | 0.532 | | |
| | Vinyl crotonate | 0.5(0.28) | 60 | 450 | | 9.3 | 14,600 |
| | do | 1.0(0.56) | 70 | 300 | | 10.0 | 31,000 |
| | do | 1.0(0.56) | 60 | 450 | | 10.1 | 68,400 |
| | do | 2.0(1.12) | 60 | 450 | | 10.8 | >100,000 |
| | | | | | | 9.4 | 96,000(1%) |
| | | | | | | 9.2 | 21,200(0.5%) |
| | Vinyl acrylate | 1.0(0.64) | 70 | 300 | | 9.4 | 9,000 |
| | do | 2.0(1.28) | 60 | 450 | | 9.5 | >100,000 |
| | | | | | | 9.3 | >100,000(1%) |
| | | | | | | 9.6 | 23,600(0.5%) |
| | do | 2.0(1.28) | 70 | 300 | | 10.1 | >100,000 |
| | | | | | | 10.5 | 51,000(1%) |
| | | | | | | 9.3 | 16,800(0.5%) |

PROPYLENE-MALEIC ANHYDRIDE

| | | 0 | 70 | 100 | 0.756 | | |
|---|---|---|---|---|---|---|---|
| | Vinyl acrylate | 1.0(0.64) | 70 | 100 | | 10.4 | 10,600 |
| | do | 1.0(0.64) | 60 | 130 | | 10.4 | 21,400 |
| | do | 2.0(1.28) | 60 | 130 | | 9.5 | >100,000 |
| | | | | | | 8.5 | >100,000(1%) |
| | | | | | | 8.5 | 63,600(0.5%) |

ISOBUTYLENE-MALEIC ANHYDRIDE

| | | 0 | 80 | (1) | 2.754 | | |
|---|---|---|---|---|---|---|---|
| | Vinyl acrylate | 1.0(0.79) | 80 | (1) | | 10.5 | 25,000 |

[1] The pressure in these runs was autogenous.

A few general conclusions can be reached by examining these data, of Table I. Vinyl acrylate appears to be the superior cross-linking agent usable with maleic anhydride and the $C_2$–$C_4$ olefins generally. For ethylene and maleic anhydride only, vinyl crotonate is an excellent cross-linking agent. Thus, it is seen that the various cross-linking agents will be operable in different degrees of efficiency depending on the olefins which are copolymerized with maleic anhydride. Of course, all of the vinyl esters of the olefinically unsaturated carboxylic acids having 3 to 24 carbon atoms will be operable as cross-linking agents in varying degrees with the olefin-maleic anhydride copolymers. This is contrasted to divinyl benzene and a number of other compounds which might be expected to be good cross-linking agents but which are not operable at all as cross-lyinking agents with these olefin and maleic anhydride comonomers. Generally speaking the molecular weight of the interpolymer formed and/or degree of cross-linking decreases with increasing temperature and increases with increasing pressure. This is borne out by the data of Table I. Also the larger the amount of cross-linking agent which is used the greater will be the degree of cross-linking. It should be noted that all the experiments summarized in Table I were carried out in a similar manner to Examples 1, 2, 3, 4 and 5 which are described in detail hereinabove. Where the Brookfield viscosity is greater than 100,000 cp., the salts have been tested at the lower 1% and 0.5% concentrations as indicated in the table, in addition to the normal ½% concentration.

EXAMPLE 10

The experiment of Example 10 was run in a substantially identical manner as that of Example 1, except that in Example 10, 3.43 grams of vinyl acrylate (representing 1% by weight, 0.64 mol percent, based on reacting monomers) were charged with the other reactants to the autoclave, which is indicated as follows:

| | |
|---|---|
| Maleic anhydride | grams 267 |
| Propylene | p.s.i.g. 100 |
| Benzene | cc. 2089 |
| Benzoyl peroxide | grams 3.48 |
| Vinyl acrylate | do 3.43 |
| Temperature | °C. 70 |

The reaction time was about 14½ hours, and the yield of polymer was 383 grams.

A specific viscosity determination was attempted on the polymer produced in Example 10 but it was found that 1% of this polymer formed an insoluble gel in dimethylformamide, so no specific viscosity determination was possible.

A sample of the polymer of Example 10 was added to sufficient water containing sodium hydroxide to make up a 1½% concentration of the polymer in water, the sodium hydroxide having been added in sufficient amount to neutralize the maleic anhydride copolymer forming substantially the disodium salt of the polymer and giving a pH of 10.42. The resulting dispersion of the polymer salt in water was tested for viscosity with a Brookfield viscosimeter using a number 4 spindle and at 6 r.p.m. The viscosity of the dispersion was 10,600 centipoises at room temperature (about 25° C.).

EXAMPLE 14

In a substantially identical manner to Example 2, the following experiment was carried out, except for changes in conditions and reactor charges indicated as follows:

| | |
|---|---|
| Maleic anhydride | 196 grams. |
| Isobutylene | 123 grams. |
| Benzene | 1600 cc. |
| Vinyl acrylate | 3.08 grams. |
| Benzoyl peroxide | 0.80 grams. |
| Temperature | 80° C. |
| Pressure | Autogenous. |

The amount of vinyl acrylate represents 1% by weight, 0.79 mol percent, based on reacting monomers, the reaction time was about 18 hours, and the polymer yield was 301 grams.

As in Example 2, an attempted specific viscosity determination using 1% of the product polymer in dimethylformamide resulted in an insoluble gel, so no specific viscosity determination could be made.

In a similar manner to that described in Example 2, a 1½% dispersion of the sodium salt of the polymer in water was prepared having a pH of 10.50. A Brookfield viscosity determination of this aqueous dispersion gave a viscosity of 25,000 centipoises at room temperature (about 25° C.).

EXAMPLE 15

In a substantially identical manner to Example 2, the following experiment is carried out, except for changes in conditions and reactor charges indicated as follows:

| | |
|---|---|
| Maleic anhydride _____ grams__ | 267 |
| Ethylene _____ p.s.i.g__ | 450 |
| Benzene _____ cc__ | 2089 |
| Benzoyl peroxide _____ grams__ | 3.48 |
| Vinyl linoleate _____ do____ | 9.36 |
| Temperature _____ ° C__ | 60 |
| Reaction time _____ hours__ | 18 |

The amount of vinyl linoleate cross-linking agent is 0.56 mol percent (2.7 wt. percent) based on reacting monomers. The polymer product obtained forms an insoluble gel at 1% concentration in dimethylformamide, so no specific viscosity can be made. The effectiveness of vinyl linoleate as a cross-linking agent is determined using the Brookfield viscosimeter method described in Example 2.

EXAMPLE 16

This experiment is also carried out in a substantially identical manner to that of Example 2, except for changes in conditions and reactor charges indicated as follows:

| | |
|---|---|
| Maleic anhydride _____ grams__ | 267 |
| Ethylene _____ p.s.i.g__ | 450 |
| Benzene _____ cc__ | 2089 |
| Benzoyl peroxide _____ grams__ | 3.48 |
| Divinyl itaconate _____ do____ | 5.57 |
| Temperature _____ ° C__ | 60 |
| Reaction time _____ hours__ | 18 |

The amount of divinyl itaconate represents 1.62% by weight (0.56 mol percent), based on reacting monomers. The polymer product obtained by this experiment forms an insoluble gel in dimethylformamide at 1% concentration, so no specific viscosity determination can be made, and the effectiveness of this cross-linking agent is determined by the Brookfield viscosimeter method as described in Example 2.

*Table II*

[Selection of optimum pH for thickening operations using alkali metal vs. amine bases for neutralization [1]]

A. NEUTRALIZED WITH SODIUM HYDROXIDE TO SPECIFIED pH

| pH | Visc.[2] | pH | Visc.[2] |
|---|---|---|---|
| 3.6 | 3,200 | 8.8 | 56,400 |
| 4.8 | 53,600 | 9.2 | 60,000 |
| 6.6 | 50,000 | 9.6 | 61,200 |
| 7.3 | 48,000 | 10.5 | 61,200 |
| 8.1 | 46,400 | | |

B. NEUTRALIZED WITH AMMONIUM HYDROXIDE TO SPECIFIED pH

| pH | Visc.[2] | pH | Visc.[2] |
|---|---|---|---|
| 3.80 | 67,200 | 7.00 | 92,400 |
| 4.55 | 97,400 | 7.65 | 86,600 |
| 5.35 | 95,400 | 8.2 | 71,600 |
| 6.35 | 95,600 | | |

[1] This crosslinked ethylene-maleic anhydride interpolymer was prepared as described in Example No. 2 with exception of reaction presure which was 275 p.s.i. and reaction temperature which was 65° C.
[2] Brookfield viscosity at room temperature for 1.5% aqueous solution No. 4 spindle.

The data of Table II above show the viscosities of dium hydroxide neutralized interpolymers and ammo hydroxide neutralized interpolymer at various This serves as a guide for neutralization to optimum cosities for these two different types of bases. In the of the alkali metal base, the preferred range is about about 11 pH, or possible 8 to about 10, but viscositie high at pH values as low as about 5. In the case c amine base viscosities are high from pH 4 to abo Viscosities continue at a high level with addit amounts of added base, however, due to a bufferin tion the pH rise is small. The preferred pH rang these amine salts being about 5 to about 8.

The data in Table III below were obtained with e ene-maleic anhydride interpolymers cross-linked with by weight based on reacting monomers of vinyl crot using 1% aqueous polymer salt solutions. The effe temperature and pressure of polymerization on the cosity of ammonium and sodium salt solutions of th terpolymers at or near optimum pH for maximum cosity is shown in this table. Viscosities were d mined in the usual manner using a Brookfield visco eter.

*Table III*

| Polymerization | | NH₄OH Neutralization | | NaOH Neutralization | |
|---|---|---|---|---|---|
| Temp., ° C. | Pressure, p.s.i.g. | pH | Viscosity | pH | Visc |
| 70 | 300 | 6.7 | 12,800 | 10.0 | |
| 65 | 300 | 6.4 | 57,200 | 9.8 | |
| 60 | 450 | 6.2 | 81,200 | 8.9 | |
| 65 | 550 | 6.5 | 54,800 | 10.2 | |
| 75 | 300 | 6.3 | 6,400 | 10.1 | |
| 65 | 275 | 6.3 | 58,000 | 8.9 | |

Although the invention has been described in term specific examples which are set forth in considerable tail, it should be understood that this is by way of i tration only and that the invention is not necessarily ited thereto since alternative improvements and opera techniques will become apparent to those skilled in art in view of the disclosure. Accordingly, modifica are contemplated which can be made without depa from the spirit of the described invention.

I claim:

1. A cross-linked interpolymer comprising substan ly equimolar portions of maleic anhydride and an o having from 2 to 4 carbon atoms, and a cross-lin agent which is a vinyl ester of an olefinically unsatur aliphatic carboxylic acid having from 3 to 24 ca atoms in an amount in the range of about 0.1 mol cent to about 5 mol percent based on reacting monon 2. The interpolymer of claim 1, wherein the amoun said cross-linking agent is in the range of about 0. about 3 mol percent.

3. A cross-linked interpolymer comprising substan ly equimolar portions of maleic anhydride and an o having from 2 to 4 carbon atoms, and a cross-lin agent which is a vinyl ester of an olefinically unsatur aliphatic carboxylic acid having from 3 to 24 ca atoms in at least an amount sufficient to make said in polymer substantially insoluble in dimethylformamid 25° C.

4. The interpolymer of claim 3, wherein said cr linking agent is vinyl acrylate.

5. The interpolymer of claim 3, wherein said olefi ethylene and said cross-linking agent is vinyl crotor 6. The interpolymer of claim 3, wherein said olefi ethylene and said cross-linking agent is vinyl linoleat 7. The interpolymer of claim 3, wherein said olefi ethylene and said cross-linking agent is divinyl itacor 8. A composition of matter comprising an aqueous persion of from about 0.1% to abut 15% by weight salt selected from the class consisting of alkali metal ine salts of a cross-linked interpolymer of substantially uimolar portions of maleic anhydride and an olefin having from 2 to 4 carbon atoms, and a cross-linking agent lich is a vinyl ester of an olefinically unsaturated aliatic carboxylic acid having from 3 to 24 carbon atoms an amount in the range of about 0.1 mol percent to out 5 mol percent based on reacting monomers.

9. The composition of claim 8, wherein said salt is :sent in an amount of between about 0.25% to about % by weight, said cross-linking agent is present in ount of between 0.3 mol percent and about 3 mol perit.

10. The composition of claim 9, wherein the pH is in : range of about 5 to about 11 and said salt is an alkali :tal salt.

11. A composition of matter comprising an aqueous persion of about 0.1 to about 15% of a salt selected m the class consisting of alkali metal and amine salts a cross-linked interpolymer of substantially equimola; rtions of maleic anhydride and an olefin having from o 4 carbon atoms, and a cross-linking agent which is a yl ester of an olefinically unsaturated aliphatic carxylic acid having from 3 to 24 carbon atoms in at least amount sufficient to make said interpolymer substanlly insoluble in dimethylformamide at 25° C.

12. The composition of claim 11, wherein said salt is ammonium salt present in an amount of betweer. out 0.25% and about 10%, and the pH is in the range about 4 to about 10.

13. The composition of claim 11, wherein said salt is sodium salt present in an amount of between about .5% and about 10%, and the pH is in the range of out 5 to about 11.

14. The composition of claim 13, wherein said crossking agent is vinyl acrylate.

15. The composition of claim 13, wherein said olefin ethylene and said cross-linking agent is vinyl crotonate.

16. A method of printing textile fabric which comprises ating said fabric with a printing paste comprising a loring material and an aqueous dispersion of about .% to about 15% of a salt selected from the class conting of alkali metal and amine salts of a cross-linked erpolymer of substantially equimolar portions of maleanhydride and an olefin having from 2 to 4 carbon ms, and a cross-linking agent which is a vinyl ester of olefinically unsaturated aliphatic carboxylic acid hav- ; from 3 to 24 carbon atoms in at least an amount sufient to make said interpolymer substantially insoluble dimethylformamide at 25° C., and drying said fabric.

17. The method of claim 16, wherein said salt is sodium salt, said olefin is ethylene, and said cross-linking agent is vinyl crotonate.

18. A salt selected from the class consisting of alkali metal and amine salts of a cross-linked interpolymer of substantially equimolar portions of maleic anhydride and an olefin having from 2 to 4 carbon atoms, and a cross-linking agent which is a vinyl ester of an olefinically unsaturated aliphatic carboxylic acid having from 3 to 24 carbon atoms in an amount in the range of about 0.1 mol percent to about 5 mol percent based on reacting monomers.

19. A salt of claim 18 wherein said cross-linking agent is present in an amount of between 0.3 mol percent and about 3 mol percent.

20. A salt of claim 18 which is an alkali metal salt.

21. A salt selected from the class consisting of alkali metal and amine salts of a cross-linked interpolymer of substantially equimolar portions of maleic anhydride and an olefin having from 2 to 4 carbon atoms, and a crosslinking agent which is a vinyl ester of an olefinically unsaturated aliphatic carboxylic acid having from 3 to 24 carbon atoms in at least an amount sufficient to make said interpolymer substantially insoluble in dimethylformamide at 25° C.

22. A salt of claim 21 which is an ammonium salt.

23. A salt of claim 21 which is a sodium salt.

24. A salt of claim 23 wherein said cross-linking agent is vinyl acrylate.

25. A salt of claim 23 wherein said cross-linking agent is vinyl crotonate and said olefin is ethylene.

26. A salt of claim 22, wherein said cross-linking agent is vinyl crotonate and said olefin is ethylene.

References Cited in the file of this patent

UNITED STATES PATENTS

| | | |
|---|---|---|
| 2,202,846 | Garvey et al. | June 4, 1940 |
| 2,378,629 | Hanford | June 19, 1945 |
| 2,449,489 | Larson | Sept. 14, 1948 |
| 2,519,348 | Burnell | Aug. 22, 1950 |
| 2,533,635 | Seymour | Dec. 12, 1950 |
| 2,599,371 | Chadderton | June 3, 1952 |
| 2,647,886 | Seymour | Aug. 4, 1953 |
| 2,754,280 | Brown | July 10, 1956 |

FOREIGN PATENTS

| | | |
|---|---|---|
| 496,650 | Canada | Oct. 6, 1953 |

OTHER REFERENCES

The Borden Company, Monomer-Polymer Laboratories, Price List, Jan. 1, 1958, page 15.